United States Patent [19]

Rush, Jr. et al.

[11] Patent Number: 5,660,202

[45] Date of Patent: Aug. 26, 1997

[54] PROCESS AND APPARATUS FOR INSERTION OF ROBOTS IN GAS DISTRIBUTION SYSTEMS

[75] Inventors: William F. Rush, Jr., Tinley Park; Bruce K. Campbell; Kenneth C. Hardy, both of Chicago; Lynn A. Sweetwood, Round Lake Beach, all of Ill.

[73] Assignee: Institute of Gas Technology, Des Plaines, Ill.

[21] Appl. No.: 167,772

[22] Filed: Dec. 15, 1993

[51] Int. Cl.$^6$ .............. F16K 43/00; F16L 55/18; F16L 55/26

[52] U.S. Cl. .............. 137/318; 137/240; 138/94; 138/97

[58] Field of Search .............. 137/318, 15, 315, 137/240; 138/93, 94, 97

[56] References Cited

U.S. PATENT DOCUMENTS

| | | | |
|---|---|---|---|
| 398,836 | 3/1889 | Lieb | 406/183 |
| 524,006 | 8/1894 | Underwood | 406/183 |
| 555,079 | 2/1896 | Collins | 406/183 |
| 567,654 | 9/1896 | Pike | 406/182 |
| 587,107 | 7/1897 | Sherrerd | 137/318 |
| 940,356 | 11/1909 | Phelps | 137/318 |
| 2,396,964 | 3/1946 | O'Brien | 137/318 |
| 2,812,778 | 11/1957 | Ver Nooy | 138/94 |
| 2,906,295 | 9/1959 | Ver Nooy | 138/94 |
| 3,025,885 | 3/1962 | Ver Nooy | 138/94 |
| 3,108,499 | 10/1963 | Duncan | 137/318 |
| 3,139,932 | 7/1964 | Johnson | 406/183 |
| 3,206,140 | 9/1965 | Knight et al. | 406/183 |
| 3,384,421 | 5/1968 | Flatt | 406/183 |
| 3,385,314 | 5/1968 | Thompson | 137/318 |
| 3,508,497 | 4/1970 | Matsukata | 406/182 |
| 3,603,264 | 9/1971 | Von Arx | 138/97 |
| 3,652,107 | 3/1972 | Tickett | 137/318 |
| 3,681,191 | 8/1972 | Farrelly | 406/182 |
| 3,826,539 | 7/1974 | Kunz et al. | 406/182 |
| 3,842,864 | 10/1974 | Riegel et al. | 138/93 |
| 3,866,628 | 2/1975 | Weber et al. | 406/183 |
| 3,868,071 | 2/1975 | Weaver | 406/182 |
| 3,991,791 | 11/1976 | Luckenbill | 138/94 |
| 4,026,329 | 5/1977 | Thompson | 138/93 |
| 4,240,459 | 12/1980 | Trautwein | 137/318 |
| 4,264,244 | 4/1981 | Steele | 406/182 |
| 4,272,984 | 6/1981 | Bell | 138/93 |
| 4,291,727 | 9/1981 | Yie et al. | 137/318 |
| 4,334,806 | 6/1982 | Liu | 406/31 |
| 4,383,546 | 5/1983 | Walters, Jr. | 137/240 |
| 4,441,561 | 4/1984 | Garmong | 138/93 |
| 4,485,668 | 12/1984 | Hudson | 73/40.5 A |
| 4,505,295 | 3/1985 | Quin et al. | 137/315 |
| 4,527,586 | 7/1985 | Yano et al. | 137/318 |
| 4,646,787 | 3/1987 | Rush et al. | 138/93 |
| 4,649,948 | 3/1987 | Hudson | 137/318 |
| 4,655,480 | 4/1987 | Thalmann | 137/318 |
| 4,664,419 | 5/1987 | Tan et al. | 285/31 |
| 4,826,360 | 5/1989 | Iwasawa et al. | 406/110 |
| 4,941,511 | 7/1990 | Johansen et al. | 138/93 |
| 5,082,026 | 1/1992 | Smith | 137/318 |
| 5,345,964 | 9/1994 | Friedel | 408/67 |
| 5,348,045 | 9/1994 | Servé | 138/153 |

*Primary Examiner*—George L. Walton
*Attorney, Agent, or Firm*—Speckman, Pauley & Fejer

[57] ABSTRACT

A hot tap apparatus for insertion of a controllable device into an in-service pipeline comprising a housing adapted to be sealably secured to a pipe and enclose a portion of the pipe. The housing forms a chamber which is partitioned into an insertion chamber and a discharge chamber, the insertion chamber being disposed adjacent to an insertion end of the housing and the discharge chamber being disposed adjacent the discharge end of said housing. The insertion end of the housing is sealable. The apparatus further comprises a cutting apparatus for cutting an opening in the pipe sized to receive the controllable device disposed in the housing.

11 Claims, 6 Drawing Sheets

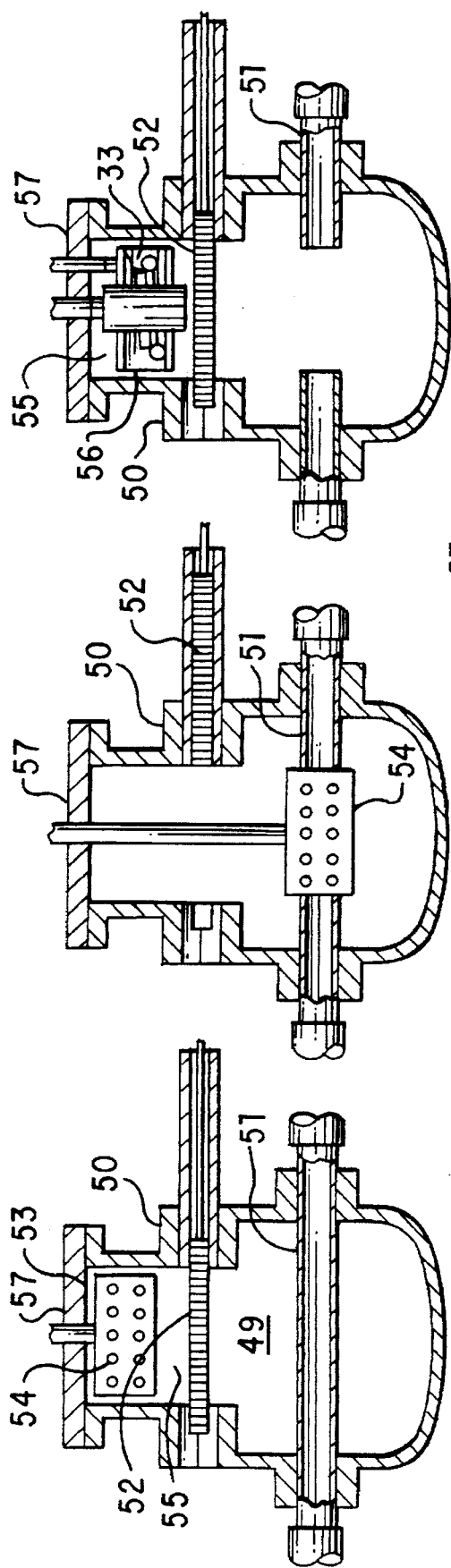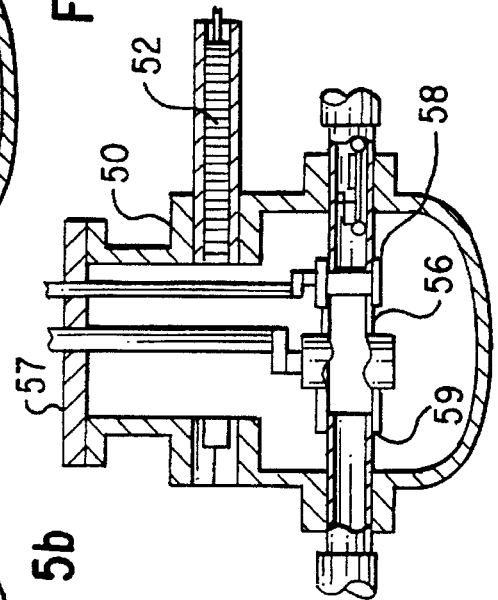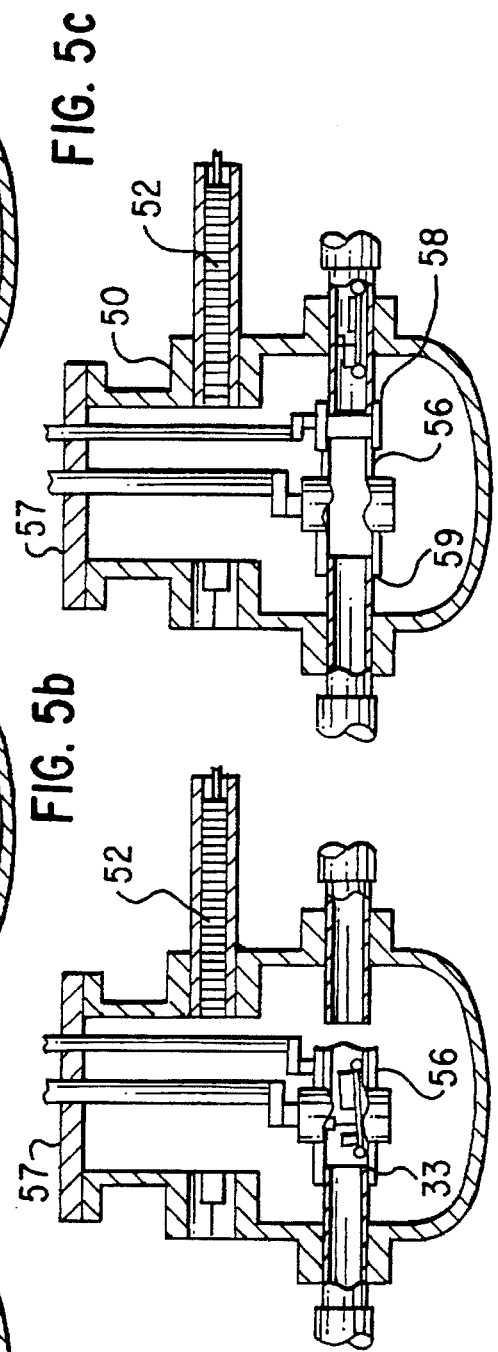
FIG. 5a
FIG. 5b
FIG. 5c
FIG. 5d
FIG. 5e

PROCESS AND APPARATUS FOR INSERTION OF ROBOTS IN GAS DISTRIBUTION SYSTEMS

BACKGROUND OF THE INVENTION

1. Field of the Invention

This invention relates to a hot tap apparatus for insertion of a controllable device, in particular, a "pig" or robot, into an in-service pipeline, such as a gas distribution pipeline. More specifically, this invention relates to an apparatus for inserting and guiding electromechanical robots into pressurized piping systems, particularly, high-pressure systems. The apparatus of this invention can be used to sense the presence and the relative location of each robot inserted into the system as well as providing for robot storage, communication and recharging.

2. Description of Prior Art

Electromechanical "pigs", or robots, are used for internal inspection and repair of underground pipelines, thereby reducing the amount of labor required to detect damage to and repair of such underground pipelines by conventional means. However, in order to use such robots, it is necessary to be able to insert them into the pipeline and maneuver them within the pipeline without interrupting flow through the pipeline. Numerous apparatuses for hot tapping in-service pipelines for insertion of control valves, regulators, and flow stoppers are known. See, for example, U.S. Pat. Nos. 4,527,586, 4,240,459, 3,385,314, 2,396,964, 940,356, 3,652,107, 4,664,419, 3,108,499, and 587,107, all of which disclose various hot tap devices for installing a valve on a pipeline while the pipeline is operating under pressure. Such a device is also taught by U.S. Pat. No. 4,655,480 which teaches a molded tapping member for connecting a branch line to a pipeline having a U-shaped saddle piece with a shell shaped bight section and a pair of laterally spaced legs, each extending outwardly from an opposite end of the bight section. After positioning on the pipeline, current is applied to a heating wire mat incorporated into the U-shaped saddle piece for welding the tapping member to the pipeline. However, none of these references addresses the insertion of an electromechanical robot into an in-service pipeline.

To insert a robot into an in-service pipeline without interrupting the fluid flow through said pipeline, it is necessary to cut an opening in the pipe through which the robot can be inserted. To prevent fluid within the pipe from escaping, the opening is enclosed by a hot tap saddle sealingly secured to the pipe. The saddle is provided with a gate valve or other means for providing access to the pipe without permitting fluid to escape from the pipe. To make the necessary hole in the in-service pipe, it is known to use mechanical cutters, such as drills. Once the opening has been cut into the in-service pipe, the robot can be inserted into the pipe. However, it is important to remember that all of these operations must be carried out, including insertion and removal of the robot from the pipe, under conditions which prevent fluid from escaping from the pipeline as well as without interrupting fluid flow through the pipeline.

U.S. Pat. No. 4,334,806 teaches a capsule injection system for injecting capsules or carriers into a hydraulic pipeline system. The capsule injection system has a reservoir filled with a carrier liquid and a magazine rack mounted within the reservoir for holding capsules in series, one above another, for injection into the pipeline. The magazine holds the capsules, which are generally cylindrical, with their longitudinal axis generally parallel to the axis of the pipeline. Because the reservoir is open to atmospheric pressure, the liquid level within the reservoir must remain at a height which is a function of the gauge pressure contained within the pipeline. Thus, the reservoir must be relatively deep to accommodate high pressures.

U.S. Pat. Nos. 524,006 and 555,079 teach dispatch tube systems. The '006 patent teaches a branch tube having an external mechanical mechanism used to open and lower a gate within the branch tube, the gate closing off the piping system when inserting the carrier. The '079 patent teaches a device having an external mechanical mechanism for inserting a carrier from a branch line to a main line.

U.S. Pat. Nos. 3,139,932 and 3,866,628 teach devices for inserting well head tools into a well in which a tool diverter apparatus is installed at the junction of a Y which is automatically positioned to close one branch of the Y by a tool entering the well through the other branch of the Y.

U.S. Pat. Nos. 398,836 and 567,654 teach switches for pneumatic tubes which allow a carrier to be deflected from one tube into a branch tube. The '836 patent teaches an electrically actuated switch while the '654 patent teach a mechanically actuated switch. U.S. Pat. No. 3,206,140 also teaches a pneumatic carrier system for directing a carrier from one conduit to another conduit while U.S. Pat. No. 3,384,421 discloses a conduit shunting device for closing off one branch of a conduit.

U.S. Pat. Nos. 3,681,191, 4,264,244, and 3,826,539 teach diverter valves employing the principles of a turntable device. U.S. Pat. No. 3,868,071 teaches a flexible coupling which is used as a line selector for directing carriers within pneumatic tube systems.

U.S. Pat. Nos. 3,603,264, 3,508,497, and 4,826,360 generally teach closed transportation systems in which a carrier device or vehicle is moved from one point to another within the system. In particular, the '264 patent teaches a tube inspecting vehicle, the '497 patent teaches an underground high-speed transportation system, and the '360 patent teaches a transfer system for a transferring device within a clean room.

SUMMARY OF THE INVENTION

It is an object of this invention to provide an apparatus for inserting and/or maneuvering electromechanical devices, in particular "pigs" or robots, within an in-service pressurized pipeline through which a fluid is flowing.

It is another object of this invention to provide an apparatus for inserting and/or maneuvering a robot within a pressurized pipeline without interrupting the flow of fluid therethrough.

It is yet another object of this invention to provide an apparatus for inserting and/or maneuvering a robot within a pressurized pipeline without fluid leaking from said pipeline.

It is yet another object of this invention to provide an apparatus suitable for storing said robot within said pressurized pipeline system.

These and other objects are achieved by a hot tap apparatus for insertion of a controllable device, such as an electromechanical robot, into an in-service pipeline in accordance with one embodiment of this invention, the apparatus comprising a housing having an insertion end and a discharge end and forming a chamber. The discharge end is adapted to be sealably secured to a pipe such that a portion of the pipe is enclosed within the housing. The chamber is sealingly partitioned by partitioning means into an insertion chamber and a discharge chamber, the insertion chamber being disposed adjacent to the insertion end of the housing and the discharge chamber being disposed adjacent to the discharge end of the housing. To prevent leakage of fluid from the pipeline system, in addition to the discharge end of the housing which is sealably secured to the pipe, the insertion end of the housing is provided with removable sealing means which can be removed for insertion of a robot into the housing and subsequently sealingly secured to the insertion end of the housing, providing a gas tight seal.

Cutting means disposed within the housing are provided for cutting an opening in the pipe, the opening sized to receive the robot. To transport the robot from the insertion end of the housing through the opening in the pipeline into the pipeline, in accordance with one embodiment of this invention, the apparatus is provided with insertion means comprising a platform adapted to be raised and lowered within the housing and the pipe, much like an elevator, on which the robot sits during transport.

To enable remote operation of the robot within the hot tap apparatus of this invention, the hot tap apparatus further comprises means for sensing the presence and position of the robot within the housing.

BRIEF DESCRIPTION OF THE DRAWINGS

These and other features of this invention will be better understood from the following detailed description taken in conjunction with the drawings, wherein:

FIGS. 5a–5e show a cross-sectional side view of a hot tap apparatus for insertion of a controllable device into a high-pressure in-service pipeline and the steps required for such insertion in accordance with one embodiment of this invention;

DESCRIPTION OF PREFERRED EMBODIMENTS

The underlying principle of the hot tap apparatus for insertion of a controllable device into an in-service pipeline in accordance with this invention is the providing of a lockhopper within the hot tap apparatus which enables insertion and withdrawal of the controllable device into the in-service pipeline without interruption of fluid flow through the pipeline and without loss of fluid pressure within the in-service pipeline. A hot tap apparatus for insertion of a controllable device, such as a motor driven "robot" capable of travelling through an in-service pipeline to provide inspection and internal pipe repair services, in accordance with one embodiment of this invention is shown in FIG. 1.

Figure 1:
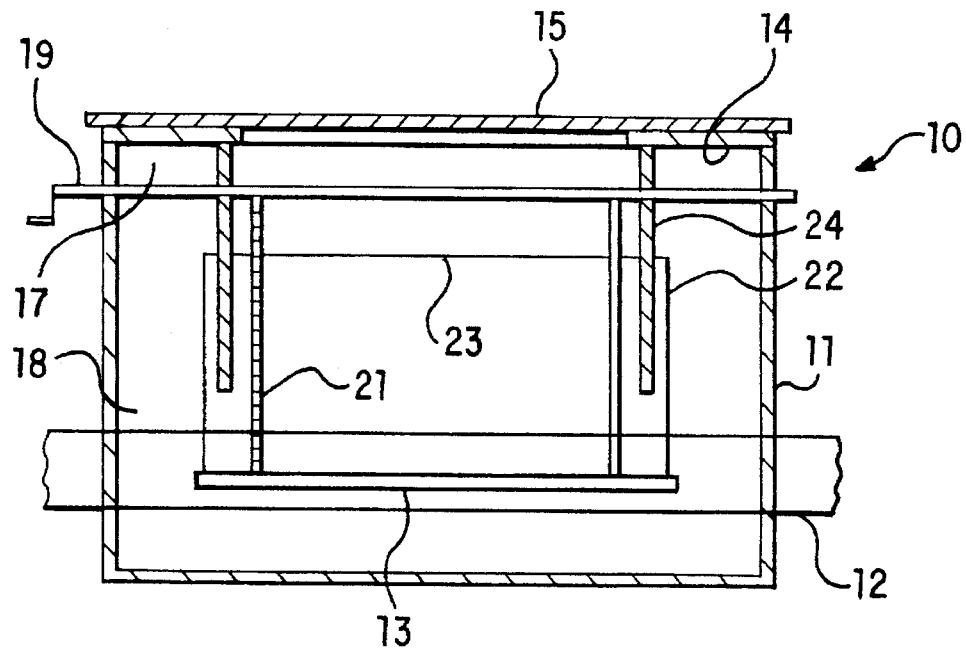
FIG. 1 is a cross-sectional side view of a hot tap apparatus for insertion of a controllable device into a low pressure in-service pipeline in accordance with one embodiment of this invention.

As shown in FIG. 1, hot tap apparatus 10 comprises housing 11 sealingly disposed around pipe 12 and having insertion end 17 through which the controllable device is inserted into housing 11 and discharge end 18 through which the controllable device is discharged into pipe 12. Insertion end 17 of housing 11 is sealingly closed off by removable lid 15. Disposed within housing 11 is device support 13 connected to means for raising and lowering device support 13, crank 19 mechanically linked to chain 21 in accordance with one embodiment of this invention. It will be apparent to those skilled in the art that other means of raising and lowering device support 13 may be utilized.

In operation, lid 15 is removed from housing 11 and a controllable device is placed on device support 13 which is in a raised position. Device support 13 is provided with parallel uprights 22 extending along two sides of device support 13 whereby when device support 13 is in a raised position for removal of a controllable device from housing 11, upper ends 23 of uprights 22 seal against peripheral inner lip 14 of housing 11. Secured to inner lip 14 and in a direction perpendicular to uprights 22 are downward extending walls 24 which seal against device support 13 when device support 13 is in a raised position, thereby providing an insertion chamber which is isolated from the volume within housing 11 surrounding device support 13, uprights 22, and walls 24. As a result, removal of lid 15 from housing 11 does not result in fluid loss or pressure loss within pipe 12.

Figure 2:
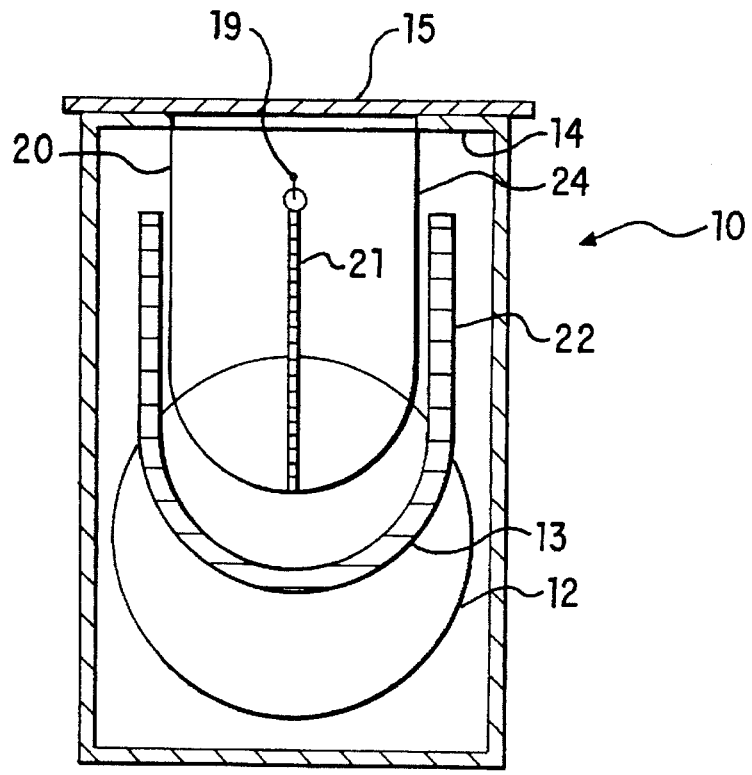
FIG. 2 is a cross-sectional end view of a hop tap apparatus for insertion of a controllable device into a low pressure in-service pipeline in accordance with one embodiment of this invention.

This concept may be more readily understood from FIG. 2 which shows an end view of a hot tap apparatus in accordance with one embodiment of this invention. As device support 13, in the form of a semi-circular structure or U-shaped cradle, having extended uprights 22 in accordance with one embodiment of this invention, is raised, the ends of uprights 22 seal against inner lip 14. At the same time, downward extending wall 24 disposed proximate the ends of device support 13 seal against device support 13 and uprights 22 to provide the insertion chamber.

In both of the embodiments shown in FIGS. 1 and 2 of the hot tap apparatus of this invention, insertion of the controllable device is in a vertical direction with respect to pipe 12.

Figure 3:
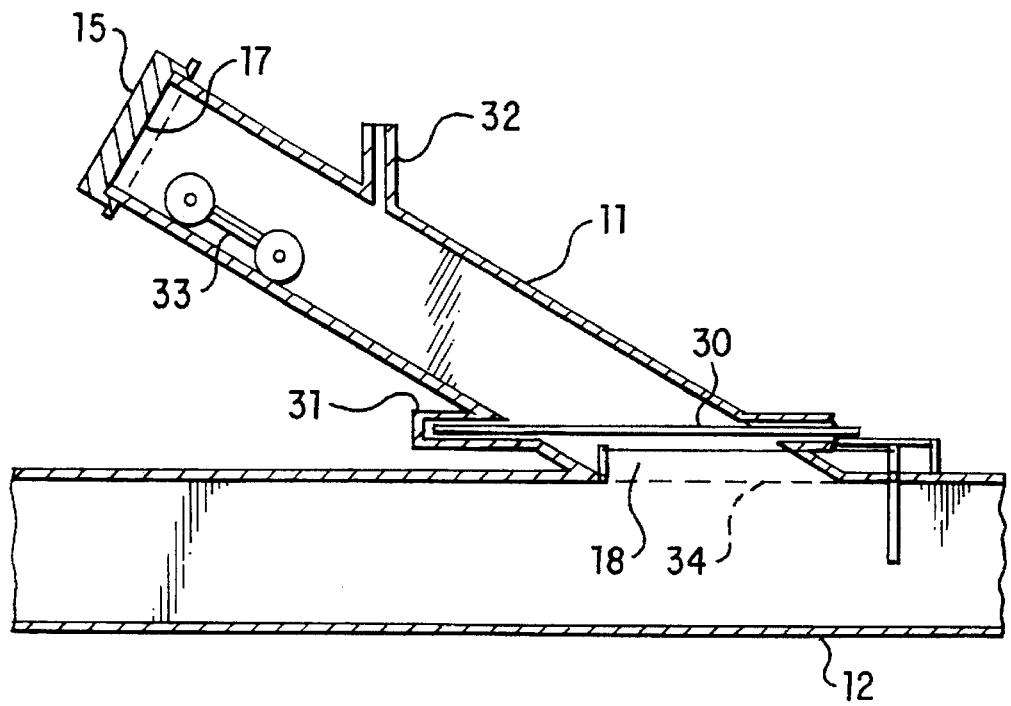
FIG. 3 is a cross-sectional side view of an angled hot tap apparatus for insertion of a controllable device into an in-service pipeline in a closed position.
Figure 4:
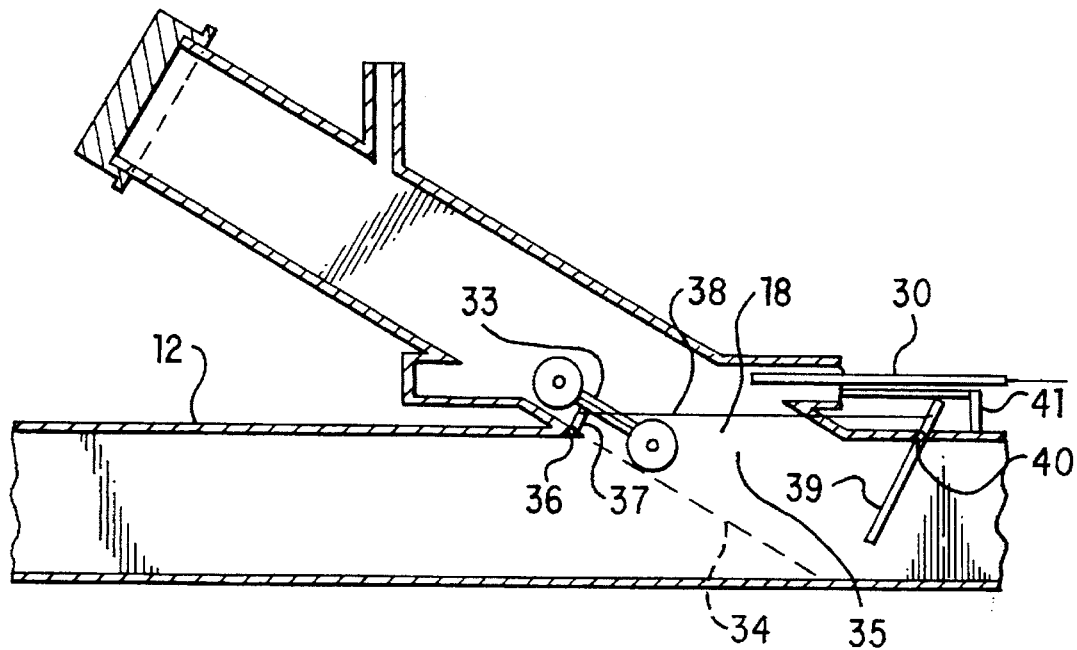
FIG. 4 is a cross-sectional side view of the embodiment of a hot tap apparatus shown in FIG. 3 in an open position.

FIGS. 3 and 4 show a hot tap apparatus for insertion of a controllable device into an in-service pipeline in accordance with another embodiment of this invention where vertical access to pipe 12 is not feasible. The angled pipe hot tap apparatus for insertion of a controllable device into an in-service pipe as shown in FIG. 3 comprises housing 11 in the form of a pipe connected to main pipe 12 at an angle no greater than about 45°. A partition 30 slidable within partition housing 31 seals off housing 11 from main pipe 12, thereby enabling access to housing 11 through insertion end 17 sealingly closed by removable lid 15. Housing 11 further comprises purge tube 32 for purging fluid accumulated in housing 11 and providing an inert atmosphere in housing 11. Such purging is particularly necessary where the fluid flowing though pipe 12 is a combustible gas. In the closed position of partition 30 as shown in FIG. 3, controllable device 33 is readily insertable into housing 11 without permitting loss of fluid or fluid pressure from pipe 12. After controllable device 33 is inserted in housing 11, insertion end 17 is closed off by lid 14, thereby isolating the space within housing 11 from the surrounding atmosphere. Thereafter, the interior of housing 11 is purged of air and partition 30 is opened as shown in FIG. 4.

To insert controllable device 33 into pipe 12, trap door 34 in the form of a wire mesh or other suitable form which permits the flow of fluid therethrough is pivotally connected at pivot point 36 to discharge end 18 of housing 11. Also pivotally connected at pivot point 36 to discharge end 18 of housing 11 is one end of lever 37. The other end of lever 37 is mechanically linked by linkage 38 in the form of a cable in accordance with one embodiment of this invention to one end of pivot lever 39 pivotally secured to the wall of pipe 12. The opposite end of pivot lever 39 extends into pipe 12. As controllable device 33 moves through housing 11 onto trap door 34, the weight of controllable device 33 causes trap door 34 to pivot into pipe 12, forming a ramp, as shown in FIG. 4. To return trap door 34 to its initial position, controllable device 33 strikes the end of pivot lever 39 extending into pipe 12, causing pivot lever 39 to pivot around pivot point 40 and, through linkage 38, causing lever 37 to pivot around pivot point 36 and, thus, raise trap door 34.

To enable controllable device 33 to return from pipe 12 into housing 11, the reverse process is carried out. Controllable device 33 strikes pivot lever 39 causing pivot lever 39 to pivot around pivot point 40 and, through linkage 38, causing the end of lever 37 attached to linkage 38 to be pulled toward pivot lever 39. As lever 37 pivots around pivot point 36, trap door 34 is pivoted around pivot point 36 into pipe 12, forming a ramp for controllable device 33 to move from pipe 12 into housing 11. To prevent leakage of fluid from within pipe 12 around pivot lever 39 and linkage 38, pivot lever housing 41 is sealingly secured to pipe 12 around pivot lever 39 and linkage 38 whereby the entire mechanism for raising and lowering trap door 34 is isolated from the atmosphere surrounding pipe 12 and housing 11.

FIGS. 5a–5e shows a hot tap apparatus for insertion of a controllable device into an in-service pipeline in accordance with one embodiment of this invention particularly suitable for use on high pressure in-service pipelines. The hot tap apparatus for high pressure applications in accordance with one embodiment of this invention comprises housing 50 secured around pipe 51 to form a gas tight seal. Sealing plate 52 which sealingly separates housing 50 into insertion chamber 55 adjacent to insertion end 53 of housing 50 and discharge chamber 49 disposed around pipe 51 is retractable to enable objects to be moved between insertion chamber 55 and discharge chamber 49.

To insert a controllable device into pipe 51, sealing plate 52 is retracted and cutting jig 54, mounted through lid 57, is lowered onto pipe 51 and a section of pipe 51 removed as shown in FIGS. 5b and 5c. Cutting jig 51 is raised above sealing plate 52 which is then extended to a closed position, separating housing 50 into insertion chamber 55 and discharge chamber 49. Lid 57 is removed, enabling removal of cutting jig 54 and replacing it with sleeve 56 containing controllable device 33 as shown in FIG. 5c. Sealing plate 52 is again retracted, allowing sleeve 56 to be lowered into discharge chamber 49 and aligned with the cut ends of pipe 51, as shown in FIG. 5d. Sleeve 56 comprises extensions 58,59 which can be extended over the cut ends of pipe 51, providing access for controllable device 33 to pipe 51 in either direction.

Figure 6:
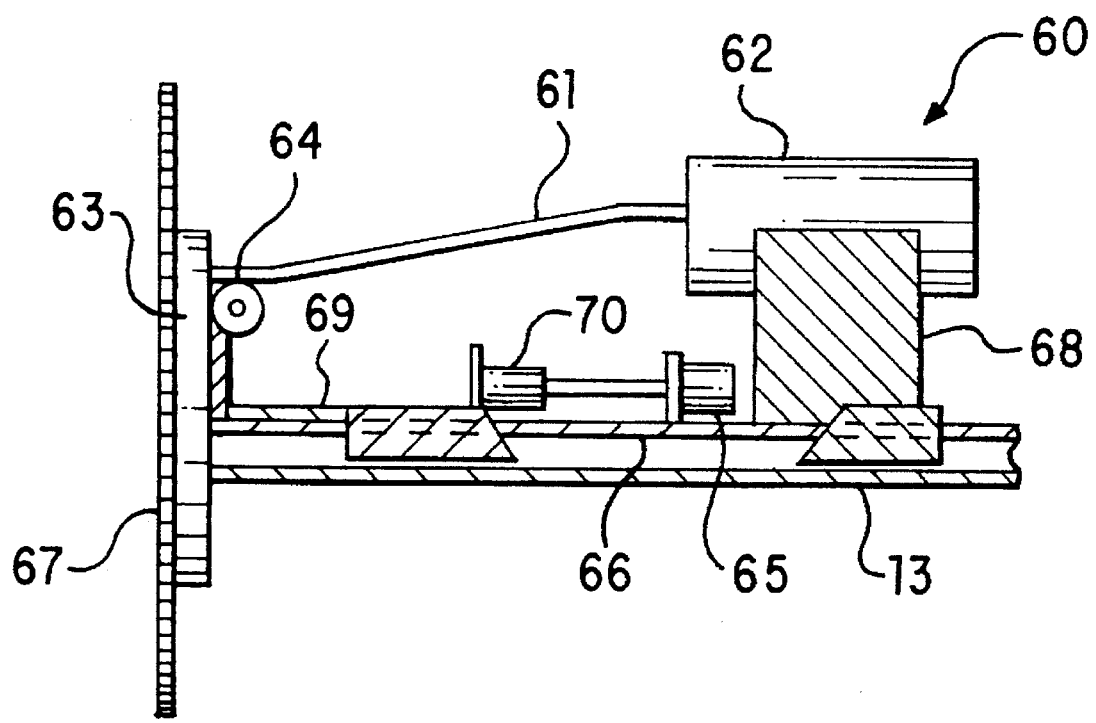
FIG. 6 is a cross-sectional schematic diagram of an insertion unit for providing an opening in an in-service pipeline enclosed by the hot tap apparatus of this invention.

FIG. 6 illustrates an apparatus for providing an opening in pipe 12, in accordance with one embodiment of this invention in the form of installation robot 60. Installation robot 60 is placed on device support 13 in housing 11 and lowered onto pipe 12 in order for installation robot 60 to cut an opening in pipe 12. As shown in FIG. 6, installation robot 60 comprises motor 62 mounted on motor mount 68 secured to horizontal positioning base 66. Motor 62 drives drive shaft 61 which, in turn, is provided with cutter assembly 63. Cutter assembly 63 comprises vertical positioning assembly 64, horizontal positioning plate 69 and cutting means 67 in the form of a saw blade or wire cutter. To adjust the horizontal position of cutter assembly 63, horizontal positioning plate 69 is horizontally displaced by horizontal positioning motor 65 secured to positioning base 66 and mechanically linked through linkage 70 to horizontal positioning plate 69. To provide vertical positioning of cutter assembly 63, drive shaft 61, in accordance with one embodiment of this invention, is flexible, thereby enabling cutter assembly 63 to be raised and lowered.

Figure 7:
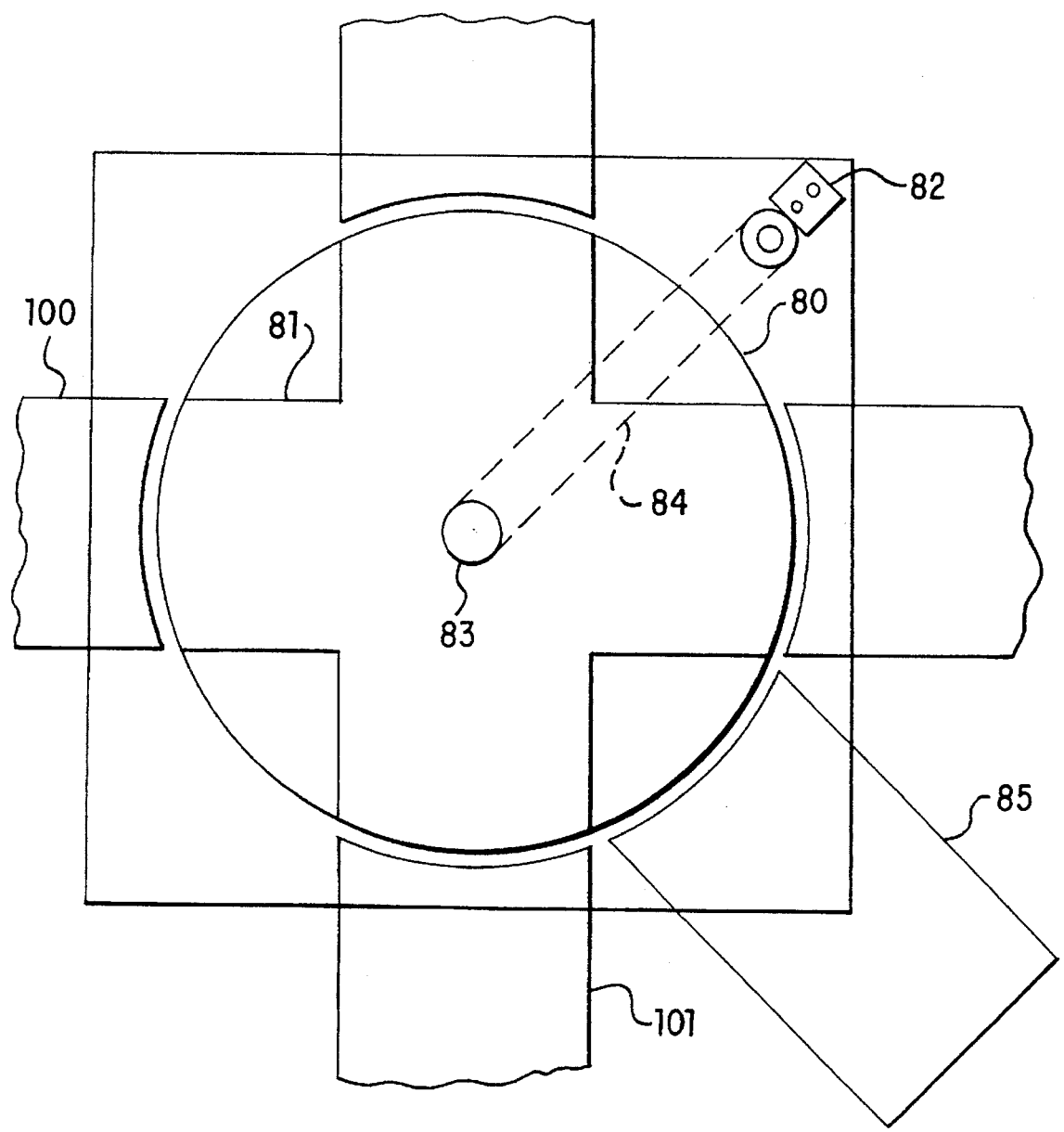
FIG. 7 is a schematic top view of a turntable insertable into an in-service pipeline for changing the direction of a controllable device within an in-service pipeline.

FIG. 7 shows a top view of a platform for raising and lowering a controllable device into an opening in a pipe, said platform in the form of a turntable. Turntable 80 comprises pipe cross 81 by which turntable 80 can be aligned with pipes 100,101 into which the pig or robot is to be inserted. Pipes 100, 101 may be pipes through which fluid flows or capped sections of pipe used to store robots not in use. Turntable 80 is rotated by means of motor 82 mechanically linked to bearing 83 by belt 84. It will be apparent to those skilled in the art that several means for driving turntable 80 are available, such as a direct drive gear or a worm drive gear. Microprocessor 85 controls the operation of turntable 80.

Figure 8:
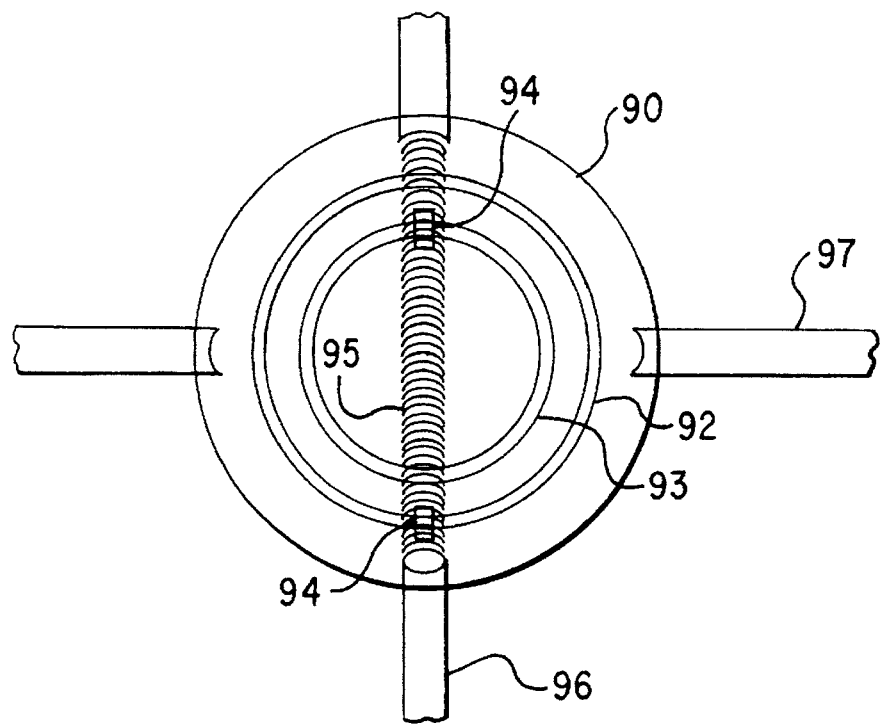
FIG. 8 is a schematic diagram of a top view of a flexible trunk turntable/insertion unit for insertion of a controllable device into an in-service pipeline in accordance with yet another preferred embodiment of this invention.
Figure 9:
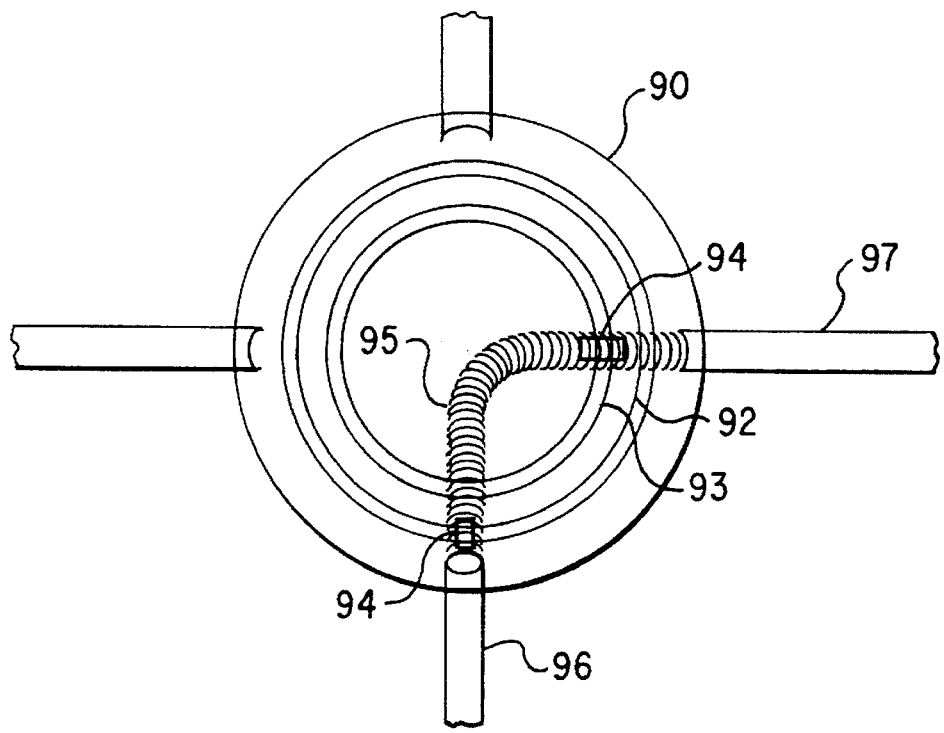
FIG. 9 is a schematic diagram of a top view of the flexible trunk turntable/insertion unit shown in FIG. 8 with one end of the flexible trunk displaced 90°.

FIG. 8 shows a top view of flexible trunk turntable/insertion unit 90 for insertion of a controllable device into an in-service pipeline in accordance with one embodiment of this invention. This embodiment is most suitable for directing controllable devices having flexible bodies. Flexible trunk turntable/insertion unit 90 comprises turntable 91 having circular grooves 92 and 93. Disposed in each of grooves 92,93 is support member 94 movable within circular grooves 92,93 and secured to an underside of flexible hose 95. To direct a controllable device disposed inside flexible hose 95 from pipe 96 to pipe 97, one of rods 94 is moved within grooves 92,93 until one of the ends of flexible hose 95 is aligned with the end of pipe 97. Such a configuration is shown in FIG. 9.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A hot tap apparatus for insertion of a controllable device in a form of one of an electromechanical "pig" and robot into an in-service pipeline comprising:

a housing having an insertion end and a discharge end, said housing forming a chamber and said discharge end adapted to be sealably secured to a pipe and enclose a portion of said pipe;

means for sealingly partitioning said chamber into an insertion chamber and a discharge chamber, said insertion chamber disposed adjacent said insertion end of said housing and said discharge chamber disposed adjacent said discharge end of said housing;

removable means for sealing said insertion end of said housing;

means for cutting an opening in said pipe sized to receive said controllable device disposed in said housing;

means for inserting said controllable device into the interior of said pipe; and means cooperatively associated with said housing for sensing a presence and a position of said controllable device when said controllable device is in said housing and when said controllable device is not in said housing.

2. A hot tap apparatus in accordance with claim 1, wherein said means for inserting said controllable device into said interior of said pipe comprises a platform adapted to be raised and lowered within said housing and said pipe on which said controllable device is raised from and lowered into said pipe.

3. A hot tap apparatus in accordance with claim 2, wherein said platform permits continuous fluid flow within said pipe independent of the position of said platform.

4. A hot tap apparatus in accordance with claim 2, wherein said platform is rotatable around an axis perpendicular to the plane of said platform.

5. A hot tap apparatus in accordance with claim 2, wherein said means for cutting an opening in said pipe comprises a motorized installation robot movably disposed on said platform, said robot comprising one of a flexible and a telescoping drive shaft operably connected at one end to a motor, a cutter assembly operably connected to an opposite end of said drive shaft, and means for at least one of horizontally and vertically positioning said cutter assembly.

6. A hot tap apparatus in accordance with claim 5, wherein said cutter assembly comprises one of a saw blade and a wire loop cutter.

7. A hot tap apparatus in accordance with claim 2, wherein said platform is in the form of a U-shaped cradle, said U-shaped cradle sealingly partitioning said chamber into said insertion chamber and said discharge chamber when disposed adjacent said insertion end of said housing.

8. A hot tap apparatus in accordance with claim 1, wherein said means for sealingly partitioning said chamber into said insertion chamber and said discharge chamber comprises a slidable planar structural member disposed within said housing and slidable in a direction transverse to a longitudinal axis of said housing.

9. A hot tap apparatus in accordance with claim 1 further comprising means for purging said insertion chamber.

10. A hot tap apparatus in accordance with claim 1, wherein said means for sealing said insertion end of said housing comprises a removable lid forming a gas tight seal when secured to said insertion end of said housing.

11. A hot tap apparatus in accordance with claim 1, wherein said means for inserting said controllable device into said pipe comprises a lever-operated trap door pivotally connected to said housing, said trap door pivoting into said pipe in an operational position, forming a ramp.

* * * * *